Aug. 19, 1941.                C. L. WEEMS ET AL                2,252,795
                        DECOY GANG ACTUATING MECHANISM
                              Filed May 22, 1940
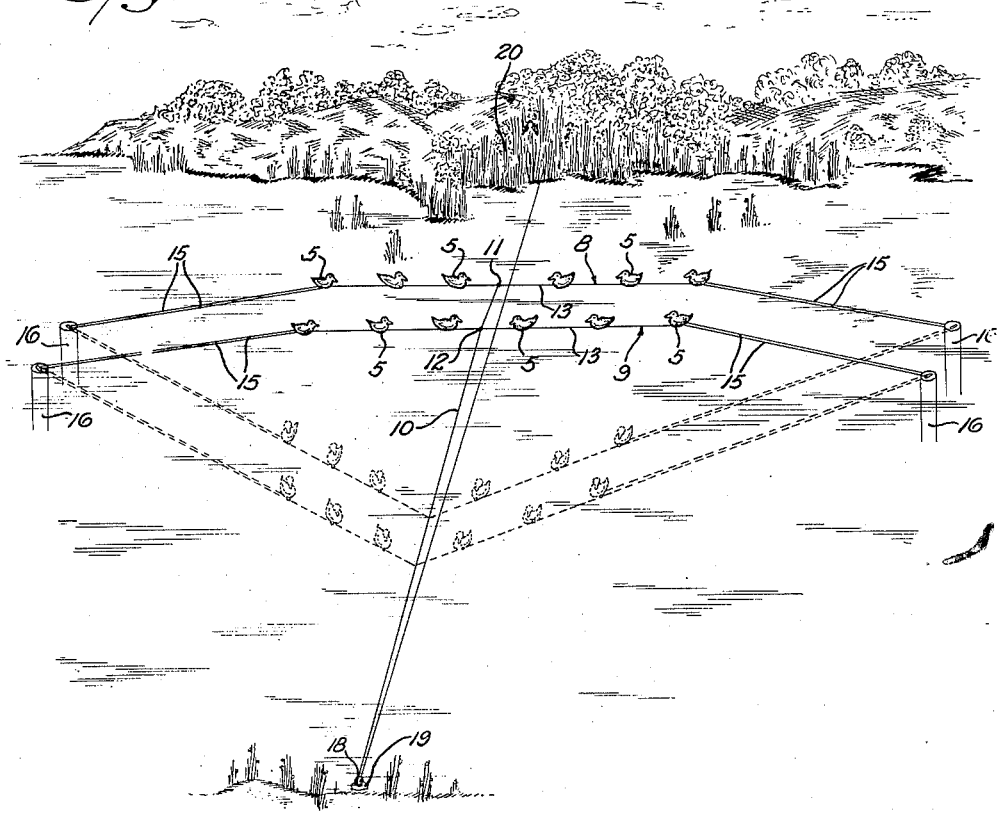
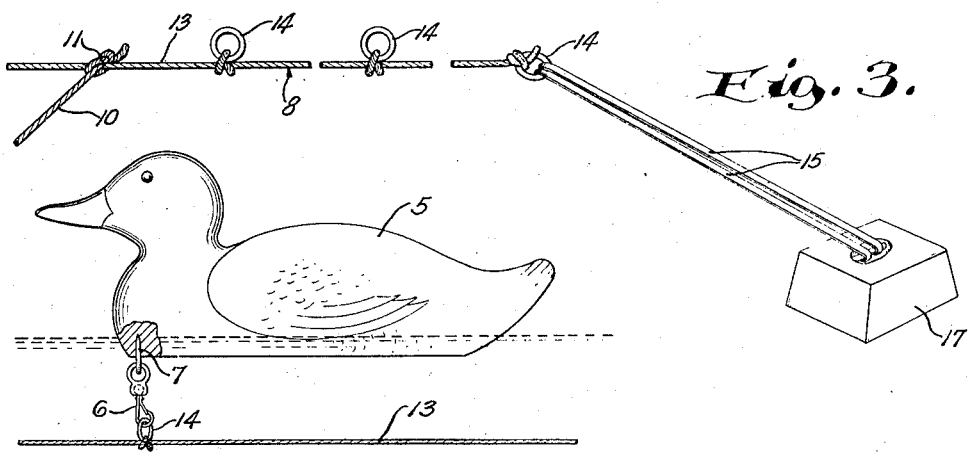
INVENTORS
Charles L. Weems &
Paul D. Mays,
BY
Morsell, Lieber & Morsell
ATTORNEYS.

Patented Aug. 19, 1941

2,252,795

UNITED STATES PATENT OFFICE 2,252,795

DECOY GANG ACTUATING MECHANISM

Charles L. Weems and Paul D. Mays, Quincy, Ill.

Application May 22, 1940, Serial No. 336,544

6 Claims. (Cl. 43—3)

This invention relates to improvements in decoy gang actuating mechanisms.

Hunters of migratory birds and fowl usually operate from blinds situated on the shore lines of bodies of water, marshes, etc. It is the practice to utilize, for the purpose of luring birds into gunshot range, groups of inanimate decoys which are set out on the water outwardly of the blinds. As it is illegal to use live decoys it will be appreciated that the effectiveness of standard inanimate decoys can be greatly enhanced by the provision of mechanism associated therewith to move the decoys over the surface of the water to simulate birds' swimming actions, and the general object of the present invention is to provide mechanism for this purpose.

A further object of the invention is to provide mechanism for actuating gangs of floating decoys whereby the decoys are caused to move in groups on the water outwardly and then inwardly relative to the hunters' blind or point of operation.

A further object of the invention is to provide decoy gang actuating mechanism which can be associated with standard decoys and which, when in use, is substantially concealed.

A further object of the invention is to provide decoy gang actuating mechanism which extends to and can be manipulated by a single person in a blind or other position remote from the decoys.

A further object of the invention is to provide decoy gang actuating mechanism which can be set out in a body of water in a very simple and expeditious manner and which is detachably connected with any desired number of decoys so as to maintain and move the same in spaced, group formations.

A further object of the invention is to provide decoy gang actuating mechanism which is inexpensive and can be arranged in a light and compact package for handling and transportation.

A further object of the invention is to provide decoy gang actuating mechanism which is very effective and efficient in use, is strong and durable, and is well adapted for the purposes set forth.

With the above and other objects in view the invention consists of the improved decoy gang actuating mechanism, and its parts and combinations as set forth in the claims, and all equivalents thereof.

In the accompanying drawing in which the same reference characters indicate the same parts in all of the views:

Fig. 1 is a perspective view of the decoy actuating mechanism as set out in a body of water, associated with groups of floating decoys, with the control line extended to a blind;

Fig. 2 is an enlarged side view of a decoy showing the manner in which it is attached to a portion of the mechanism, part of the decoy being broken away and in section; and Fig. 3 is an enlarged fragmentary detail view of the mechanism illustrating an alternative form of anchoring means associated with an end of the mechanism.

Referring now more particularly to the drawing it will appear that the decoys, of standard formation, with which the mechanism is associated, are designated by the numerals 5. For the purpose of the present invention a lower front portion of each decoy carries a swivel connecting means of any desired character. The connecting means, for purposes of illustration, may take the form of a swivel snap hook 6 secured to a decoy 5 by a staple 7.

The actuating mechanism comprises two, elongated, spaced-apart lines 8 and 9 spacedly connected at their intermediate portions by separated portions of one end of an operating line or cable 10, the attachment being effected in a simple manner by spaced knots 11 and 12.

Each of the lines 8 and 9 is of a composite character, and, as an example, each of the same may be approximately sixty feet in length. The intermediate section 13 of each line may be about one-third of the total length of the line and is formed of a suitable weight of twine or cord. At properly spaced intervals the cord of each section 13 of a line is knotted to metallic rings 14. At each end of a cord section 13 a ring 14 is secured and the ends of elongated elastic bands 15 are fastened to said rings. The elastic bands 15 are preferably in pairs, as illustrated, and the normal length of each pair of the same is approximately one-third of the total length of the composite line. When the mechanism is arranged for use, the outer or free ends of the elastic bands of both lines are attached to posts or stakes 16, as in Fig. 1, or to weights or anchors 17, as in Fig. 3.

The length of the operating line or cable 10 is dependent upon the location of the decoys, the position of the blind, and other factors. However, in the present exemplification, bearing in mind that each of the composite, decoy carrying lines 8 and 9 is approximately sixty feet in length, it is proper for the operating line 10 to have a total length of approximately two-hundred and fifty feet. When the mechanism is arranged for use, the extent of said line 10 outwardly from the knot 11 is about one hundred feet. The outermost portion of said line 10 is passed about a pulley 18 which is carried by the upper portion of an outer stake or weight 19. From the pulley 18 the remainder of the line 10 is doubled back to the shore line so that its free end extends to and is accessible for manipulation at the blind 20 or other point of operation.

Inasmuch as hunters usually have their own decoys and may have personal preferences in the matter of the number and arrangement of the same to be used, it is contemplated, in the commercial exploitation of the invention that only the secured together lines or cables 8, 9, and 10 be furnished, although, at the purchaser's option stakes or weights, connecting members, and other accessories may likewise be included. However, the present invention contemplates the associated operating cables per se, and/or the combination of the same with suitable fastening or anchoring means, and groups of inanimate decoys.

In use, the hunter will attach his decoys 5 to the spaced rings 14 on the parallel lines 8 and 9. Opposite ends of the line 9 will then be secured to stakes or weights 16 or 17 and the latter will be fixedly positioned in the water a suitable distance from the shore line and blind in a manner so that the composite line 9 is stretched out with the decoys 5 carried thereby floating on the surface of the water. The composite line 8 is similarly arranged substantially parallel to and inwardly a suitable distance from the line 9. Then, the proper extent of the operating line 10 is carried outwardly from the lines 8 and 9, at right angles thereto and away from the blind. As mentioned, at about one hundred feet from the line 8, the line 10 is passed about a pulley 18 on an outer stake or weight 19, which stake or weight is on or embedded in the bottom of the lake or river. The remainder of the line 10 is doubled back to the shore line and terminates at the blind or operating position. It should be mentioned that if stakes 16 and 18 are used for anchoring purposes, the same are below the water line. Also, there should be sufficient slack in all of the lines so as not to submerge the decoys, permitting the same to float under restraint. Obviously, with the stakes or weights submerged, the major portions of all of the lines will likewise be submerged and therefore, will be concealed.

The full line showing in Fig. 1 illustrates a preferred arrangement of the mechanism and normal positions of two groups of decoys, ready for use. Actually the connected decoys 5 and the mechanism may be positioned adjacent another group of stationary decoys. When the hunter desires to actuate the decoys 5 carried by the lines 8 and 9, he, standing in the blind 20, pulls on the operating line 10. As the opposite end of this line, after passing over the anchored pulley 18, is attached to the lines 8 and 9, the portions of these lines between their anchors, will gradually move outwardly, angularly, with the mid-portions moving the greatest distance. Ultimately, the dotted line positions of Fig. 1 will be obtained. The decoys can swivel relative to their attaching rings 14 and during movements will head in the correct direction. When moving the decoys actually give the appearance of ducks or birds swimming in spaced groups.

When the operator has caused the decoys to move outwardly a sufficient distance he merely gradually feeds out or slackens the operating line 10. During the outward movement of the decoys all of the sets of elastic sections 15 in the composite lines 8 and 9 become elongated. When the operating line 10 is gradually released or slackened, the contracting of the elastic sections 15 will cause the groups of decoys to reverse their direction of movement. The individually mounted decoys are free to swivel so as to head toward the shore line and move in groups, simulating swimming actions, from the dotted line positions. It will be evident, therefore, that the decoys, through the improved actuating mechanism, can be caused to repeatedly move outwardly from the blind, and then inwardly, in the manner of swimming.

It will be appreciated that the matter of dimensions of the various lines and cables is subject to wide variation, depending on the manner of use of the mechanism and its location. Also, one, two, or more decoy group carrying lines, anchored at their outer ends, could be actuated by a single, connected operating line, and the number of decoys used, and their precise arrangement and grouping is subject to variation, depending on the wishes and requirements of the particular user.

The improved decoy gang actuating mechanism is of simple and novel construction, and is well adapted for the purposes described.

What is claimed as the invention is:

1. In combination, an elongated flexible line, there being a yieldable section in said line, means for anchoring the opposite ends of said line in a body of water with said line in an outstretched condition, a buoyant object, means securing said buoyant object to an intermediate portion of said line, an elongated operating line attached at one end to an intermediate portion of the first-mentioned line, and means slidably anchoring an intermediate portion of the operating line remote from the first-mentioned line in one direction relative thereto, the free end portion of the operating line being extended to another remote point in the opposite direction relative to the first-mentioned line, a pull on said operating line serving to deflect and move the first-mentioned line between its points of end anchorage to cause the object carried thereby to move over the surface of the water.

2. In combination, an elongated flexible line, there being a yieldable section in said line, means for anchoring the opposite ends of said line in a body of water with said line in an outstretched condition, a buoyant object, means securing said buoyant object to an intermediate portion of said line, an elongated operating line attached at one end to an intermediate portion of the first-mentioned line, and means slidably anchoring an intermediate portion of the operating line remote from the first-mentioned line in one direction relative thereto, the free end portion of the operating line being extended to another remote point in the opposite direction relative to the first-mentioned line, a pull on said operating line serving to deflect and move the first-mentioned line between its points of end anchorage to cause the object carried thereby to move over the surface of the water and stretching the yieldable section in said line, a subsequent release on the operating line permitting retraction of the yieldable section and consequent return of the first-mentioned line and the object carried thereby to its original position.

3. In combination, an elongated flexible line, there being a yieldable section in said line, means for anchoring the opposite ends of said line in a body of water with said line in an outstretched condition, a plurality of buoyant objects, means for detachably securing said buoyant objects to spaced intermediate portions of said line, an elongated operating line attached at one end portion to an intermediate portion of the first-mentioned line, and means slidably anchoring an intermediate portion of the operating line in the body of water outwardly of and remote from the first-mentioned line, the operating line being doubled back and terminating at an operating position inwardly of and remote from the first-mentioned line.

4. In combination, three anchor members adapted for positioning at spaced points in a triangular relationship in a body of water, an elongated stretchable member extended between two of said anchors, a plurality of buoyant decoys attached to spaced intermediate portions of said elongated member, and an elongated operating member attached to said stretchable member and extending to an operating position in one direction relative to said stretchable member, an intermediate portion of said operating member being slidably engaged with the third anchor at a point in the opposite direction relative to said stretchable member.

5. In combination, a pair of spaced, substantially parallel, elongated stretchable members, means connected to opposite ends of said stretchable members maintaining the same outright in a body of water, sets of decoys spacedly attached to intermediate portions of both of said stretchable members, and an elongated operating member attached to both of said stretchable members and extending to an operating position.

6. In combination, a pair of spaced, substantially parallel, elongated stretchable members, anchor means connected to opposite ends of said stretchable members maintaining the same outright in a body of water, sets of floating decoys spacedly attached to intermediate portions of both of said stretchable members, a third anchor disposed in triangular relationship relative to the other anchor means and remote from the stretchable members, and an elongated operating member attached to both of said stretchable members and having an intermediate portion thereof slidably engaged with said third anchor.

CHARLES L. WEEMS.
PAUL D. MAYS.